United States Patent
Arisa Busquets

(10) Patent No.: US 10,926,810 B2
(45) Date of Patent: Feb. 23, 2021

(54) DEVICE AND METHOD FOR FASTENING A VEHICLE ACCESSORY

(71) Applicant: ITW METAL FASTENERS, S.L., Sabadell (ES)

(72) Inventor: Jaume Arisa Busquets, Sabadell (ES)

(73) Assignee: ITW METAL FASTENERS, S.L., Sabadell (ES)

( * ) Notice: Subject to any disclaimer, the term of this patent is extended or adjusted under 35 U.S.C. 154(b) by 107 days.

(21) Appl. No.: 16/137,780

(22) Filed: Sep. 21, 2018

(65) Prior Publication Data

US 2019/0092398 A1    Mar. 28, 2019

(30) Foreign Application Priority Data

Sep. 22, 2017 (ES) .................................. 201731142

(51) Int. Cl.
| | |
|---|---|
| B62D 27/06 | (2006.01) |
| F16B 5/02 | (2006.01) |
| F16B 5/00 | (2006.01) |
| F16B 33/00 | (2006.01) |
| F16B 43/02 | (2006.01) |
| B62D 65/02 | (2006.01) |
| B60R 9/058 | (2006.01) |

(52) U.S. Cl.
CPC ......... *B62D 27/065* (2013.01); *B62D 65/024* (2013.01); *F16B 5/0056* (2013.01); *F16B 5/025* (2013.01); *F16B 5/0216* (2013.01); *F16B 5/0233* (2013.01); *F16B 33/004* (2013.01); *F16B 43/02* (2013.01); *B60R 9/058* (2013.01)

(58) Field of Classification Search
CPC .... B62D 27/065; B62D 65/024; B60R 9/058; B60R 9/04
USPC .................................. 296/29, 37.7, 30, 35.1
See application file for complete search history.

(56) References Cited

U.S. PATENT DOCUMENTS

| | | | |
|---|---|---|---|
| 9,133,872 B2 | 9/2015 | Arisa Busquets | |
| 9,359,012 B2 * | 6/2016 | Yao ........................ | F16B 5/0233 |
| 2002/0150445 A1 * | 10/2002 | Ozawa .................. | F16B 5/0233 |
| | | | 411/546 |

(Continued)

FOREIGN PATENT DOCUMENTS

| | | |
|---|---|---|
| CN | 106640911 | 5/2017 |
| DE | 20316215 | 12/2003 |

(Continued)

*Primary Examiner* — Jason S Morrow
*Assistant Examiner* — E Turner Hicks
(74) *Attorney, Agent, or Firm* — Thompson Hine LLP

(57) ABSTRACT

The fastening device includes a nut (1) and a screw (2) coupled by being screwed together, the screw (2) being movable with respect to the nut (1), wherein the screw (2) comprises a head (3) provided with a washer (4) able to tilt in any adjustment direction, the axis of the washer (4) able to move within an angle by tilting with respect to the axis of the screw (2). A fastening method includes the steps of vertically introducing the fastening device in a polygonal hole until a seal (6) butts against the roof of the vehicle, and rotating the device in a counterclockwise direction until it butts against the same. The fastening device allows a function of adjustment to be carried out and compensates for the lack of parallelism and tolerance between the fastened accessory and the body of the vehicle.

19 Claims, 4 Drawing Sheets

(56) References Cited

U.S. PATENT DOCUMENTS

| | | | |
|---|---|---|---|
| 2007/0207012 A1* | 9/2007 | Lorenzo | F16B 5/0233 |
| | | | 411/546 |
| 2012/0093610 A1* | 4/2012 | Homner | F16B 21/073 |
| | | | 411/347 |
| 2013/0117996 A1* | 5/2013 | Ducornait | F16B 37/0842 |
| | | | 29/525.02 |
| 2014/0097218 A1* | 4/2014 | Bittner | B60R 9/04 |
| | | | 224/309 |
| 2015/0291225 A1 | 10/2015 | Yao | |
| 2017/0335873 A1 | 11/2017 | Arisa Busquets | |

FOREIGN PATENT DOCUMENTS

| | | |
|---|---|---|
| DE | 202011105943 | 10/2011 |
| DE | 102012009173 | 11/2012 |
| DE | 102012221679 | 5/2014 |
| EP | 1533185 | 5/2005 |
| EP | 2716500 | 4/2014 |
| EP | 2796729 | 10/2014 |
| ES | 2575052 | 6/2016 |
| FR | 2920015 | 2/2009 |
| JP | H09296466 | 11/1997 |
| WO | WO2016126462 | 8/2016 |

\* cited by examiner

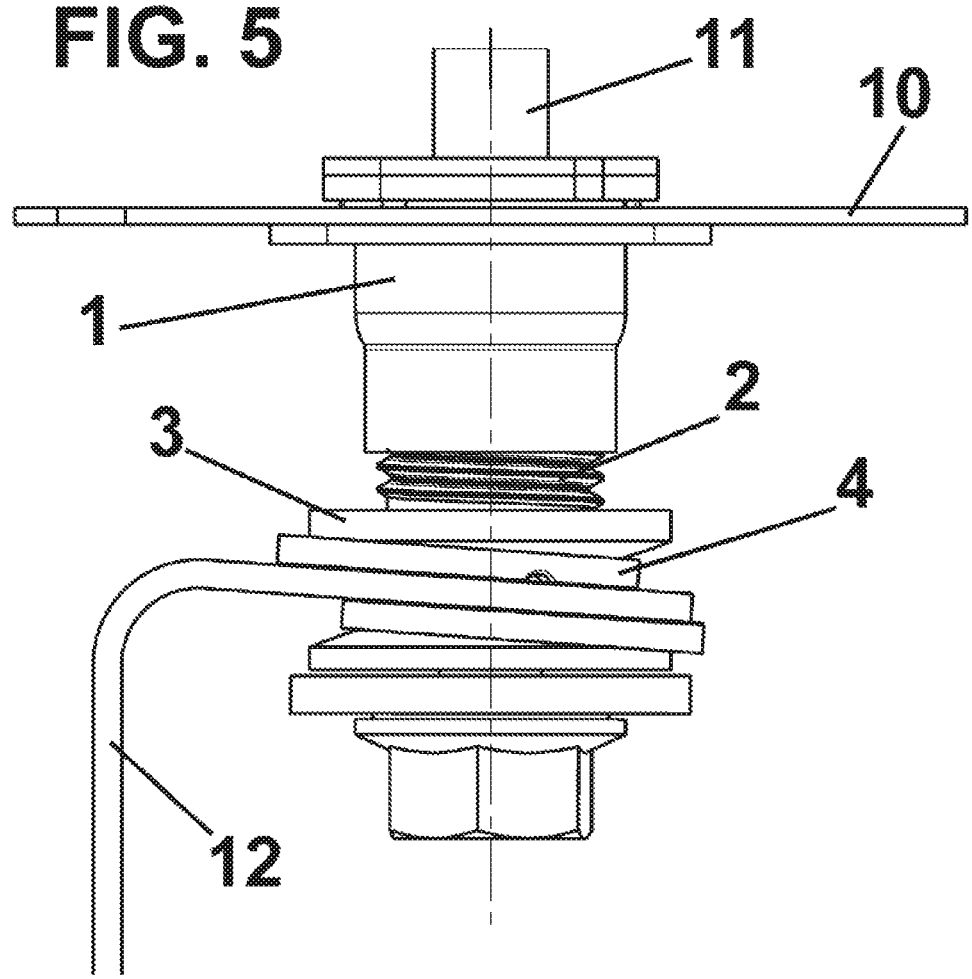

DEVICE AND METHOD FOR FASTENING A VEHICLE ACCESSORY

The present invention relates to a device and a method for fastening a vehicle accessory, for example to secure a roof bar to the roof of an automobile, compensating for the differences of parallelism between the contact surface of the roof bar and the body of the car.

BACKGROUND

Fastening devices, the aim of which is to fasten an accessory to a support panel or surface and which allow the variable space between said panel and the frame or support surface where said fastening device is anchored to be protected, are known.

Conventional fastening devices comprise a nut and a hollow screw. This screw is screwed to the thread of the nut which in in the opposite direction; in other words, the clockwise motion of the screw produces the backwards movement of the same and the counterclockwise motion produces the forwards movement of the screw inside the nut.

This hollow screw has teeth on the inside thereof so that by inserting the screw used for fastening the application the rotation of this fastening screw for the application also carries out the pull of the screw.

The known functioning of said type of fastening devices represents that when the screw is screwed, this clockwise rotation first produces the backwards movement of the screw from the nut until it covers all of the space of separation between the support panel and the vehicle frame where the fastening device is fixed.

Secondly, the continuation of the action of tightening the fastening screw produces the forward movement of said screw and the fastening of the accessory to be installed.

For example, the document EP2796729 A1 describes a compensator nut in which the screw of the compensator nut has internal connection members formed by legs oriented from the surface towards the axial shaft of said screw.

These types of screws come in boxes that contain a plurality of the same and the operator takes them and places them in the installation point, at the same time they take the application attachment screw and the application support and introduces said screw in the hollow of the screw of the compensator nut. By means of an automatic screwing machine, both the expansion of the compensator nut and the fastening of the application support of the same are done in a single operation.

These types of operations are repeated a number of times and they are ideally done with the greatest degree of safety and in the least amount of time possible. An efficient and simple process multiplies the benefits thereof by the number of repetitions of the same on the assembly line and in total represents an important economy in terms of manufacturing costs.

Other similar fastening devices, by the same applicant of the present application, are described in documents WO2016126462A1 and ES2575052A1.

Therefore, one objective of the present invention is to provide a fastening device that allows an adjustment function to be carried out and compensates for the lack of parallelism and tolerance between the fastened accessory and the body of the vehicle.

SUMMARY

The fastening device and method of the invention solves the aforementioned drawbacks and has other advantages which are described below.

The device for fastening a vehicle accessory according to the present invention comprises a nut and a screw coupled by being screwed together, the screw being movable with respect to the nut, wherein the screw comprises a head provided with a washer.

Advantageously, said screw head has an outer convex form, which is complementary to the inner concave form of the washer, and said washer is preferably joined to the screw head by means of an elastic joint, for example, by means of at least an adhesive point.

Advantageously, the fastening device according to the present invention also comprises a seal arranged between the nut and a fastening surface, for example, the roof of a vehicle.

Said seal is rotatable around the longitudinal axis of the screw and, according to a preferred embodiment, is made up of two elongated bodies joined together, said elongated bodies being substantially perpendicular to one another. Said seal is integral to the screw by means of retaining elements. Furthermore, said screw can comprise an overmolded body on the inside thereof, which also elastically joins the screw head and the washer.

According to a preferred embodiment, said seal is made of a thermoplastic elastomer (to prevent frictional wear on bodywork of the roof of the vehicle) and said washer is metal.

In accordance with a second aspect, the present invention relates to a method for fastening a vehicle accessory by means of the fastening device as was previously described, comprising the following steps:

vertically introducing the fastening device in a hole on one part of the body of the vehicle; and rotating the device to position it.

rotating the screw to carry out the final fastening of the accessory.

Advantageously, said device comprises a first rotation of less than 30°, encountering the resistance of the seal of the device, and a second rotation until reaching a final stop between 80° and 120°.

The fastening device and method according to the present invention makes it possible to adjust the same between two non-parallel surfaces until a certain degree of deviation is reached, for example, up to 4°, and said washer performs the function of adjusting and compensating the lack of parallelism and tolerance.

BRIEF DESCRIPTION OF THE DRAWINGS

For the purpose of helping to make the foregoing description more readily understandable, it is accompanied by a set of drawings which, schematically and by way of illustration and not limitation, represent an embodiment.

FIG. 5 is an elevation view of the device according to the present invention in the mounted position thereof in the vehicle.

DETAILED DESCRIPTION

Figure 1:
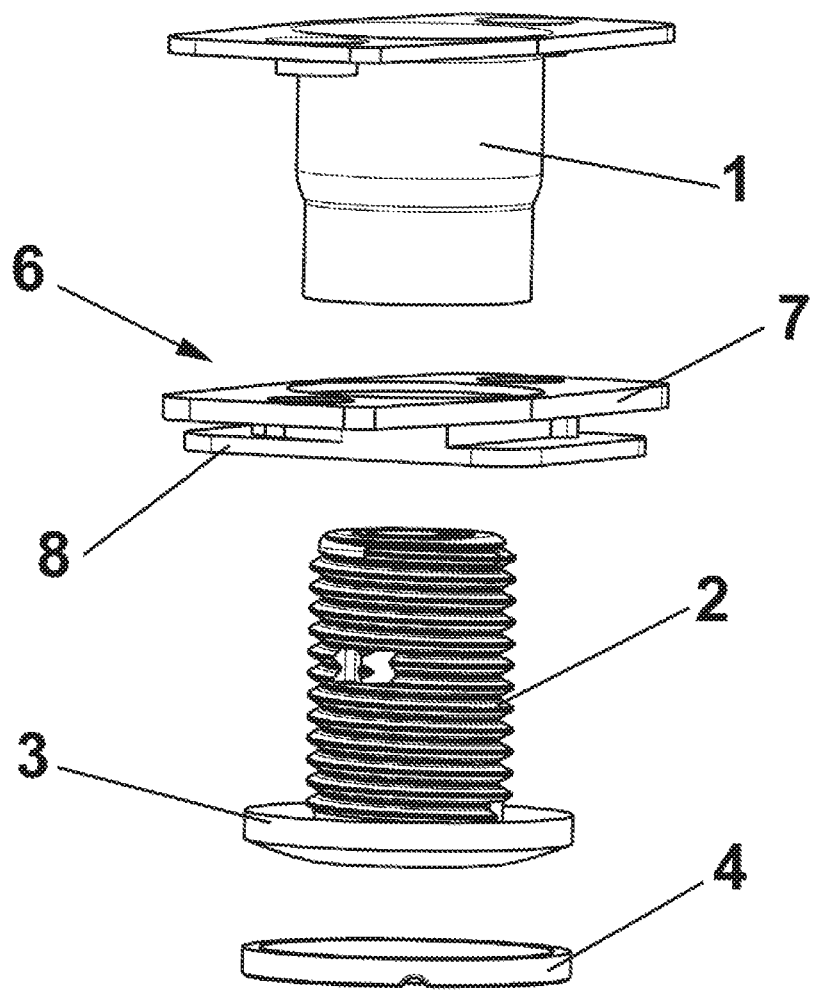
FIG. 1 is an exploded perspective view of the components of the fastening device according to the present invention.

As shown in FIG. 1, the fastening device according to the present invention comprises a nut 1 and a screw 2 coupled to each other by being screwed together, the screw 2 being movable with respect to said nut 1 for regulating the space for fastening an accessory, for example, a roof bar and the body of a vehicle.

Figure 2:
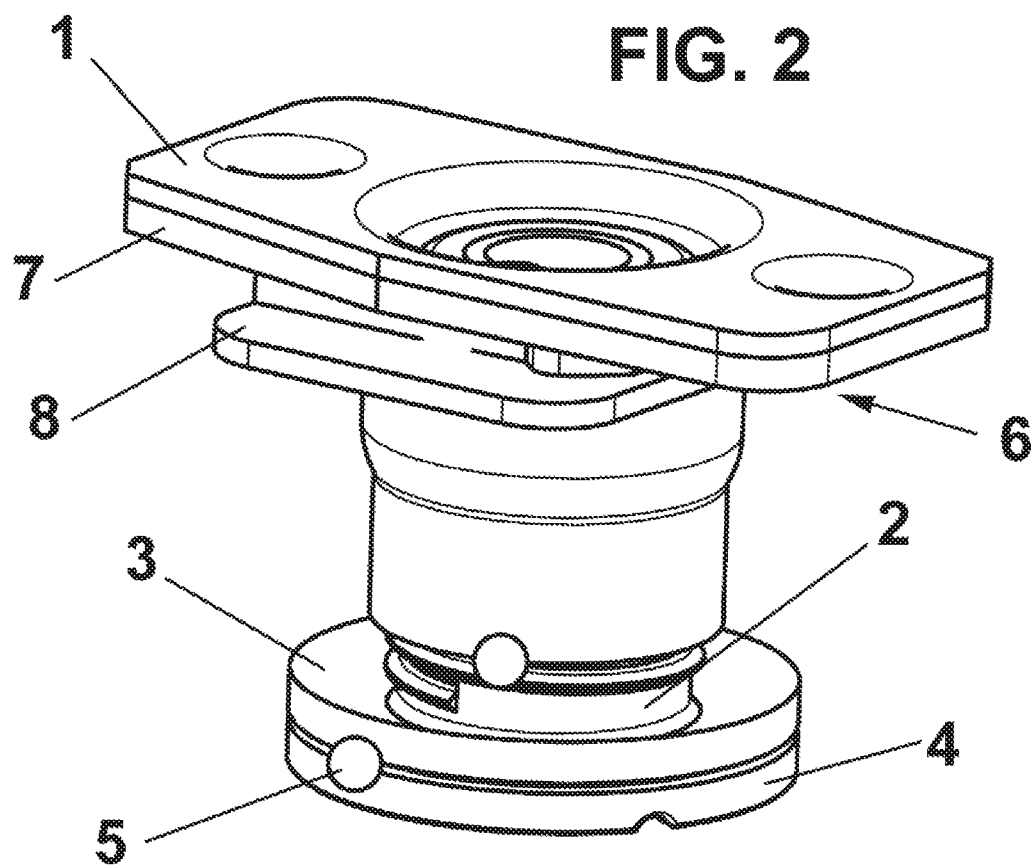
FIG. 2 is a perspective view of the components of the fastening device according to the present invention in the mounted position thereof for customer delivery.

The nut 1 comprises a cylindrical portion, inside of which the screw 2 is housed, and a flat portion, which in the mounting position is in contact with the roof of the vehicle 10, as shown in FIGS. 2 and 5.

The screw 2 comprises a head 3 which is provided with an adjusting washer 4, for example, made of metal, which carries out the function of adjusting and compensating for the lack of parallelism of the surfaces to which the fastening device is fixed, as will be shown by the present description.

Figure 3:
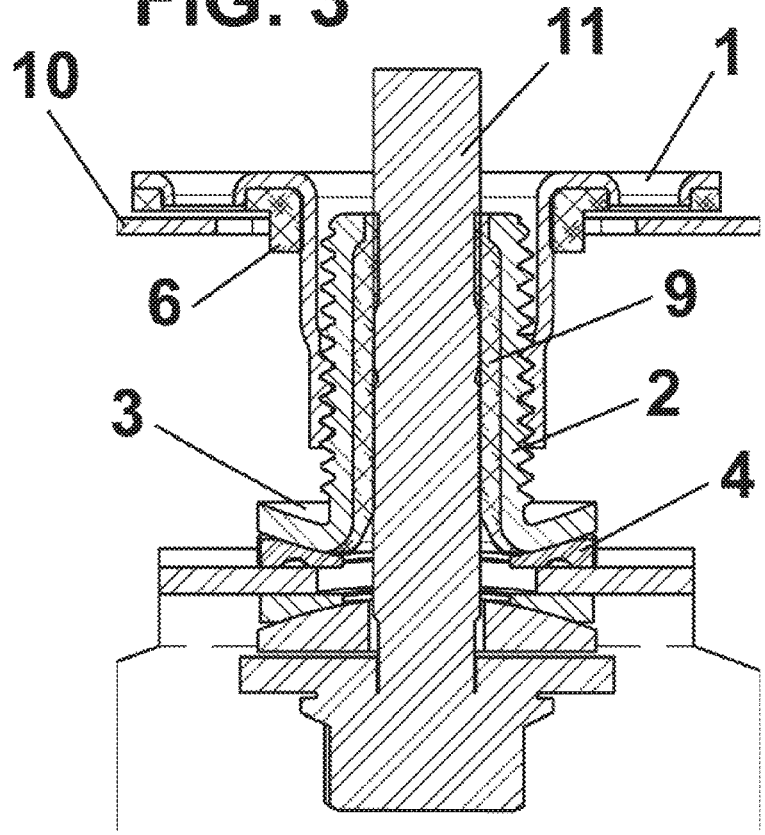
FIG. 3 is a cross-sectional view of the components of the fastening device according to the present invention in the mounted position thereof in the vehicle.
Figure 4:
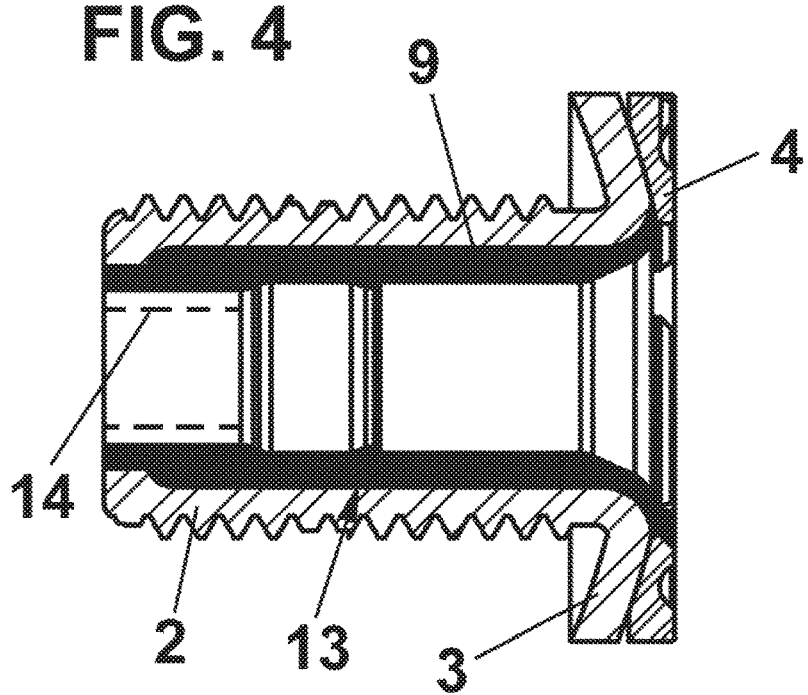
FIG. 4 is a cross-sectional view of the detail of the joint between the washer and the screw head.

To facilitate this adjusting and compensating function, said head 3 of the screw 2 has an outer convex form, which is complementary to the inner concave form of the washer 4, and said washer 4 is preferably joined to the head 3 of the screw 2 by means of an elastic joint 5. This elastic joint 5 can be done by means of one or several adhesive points, for example of silane, or by means of an overmolded body 9, as can be seen in FIGS. 3 and 4. This way, the washer 4 can tilt approximately 4° in any direction for this adjustment and compensation function, as shown in FIG. 5, in which a support 12 soldered to the body of the vehicle is also shown.

The fastening device according to the present invention also comprises a seal 6 made of an elastomeric material, which is arranged between the nut 1 and the surface to which it is fastened, for example, the roof of the vehicle 10.

According to the embodiment shown, said seal 6 is made up of two elongated bodies 7, 8 joined together, said elongated bodies 7, 8 being substantially perpendicular to one another. As can be seen in the figures, one of the elongated bodies 7 is fastened to the inner part of the flat portion of the nut 1. The two elongated bodies are spaced apart slightly to define a peripheral slot or slots in the seal between the bodies, and upon rotation of the device, including the seal, with the peripheral slot(s) aligned with the edges of the opening in the vehicle roof, body 7 will engage with one surface of the vehicle roof (e.g., the upper surface in the view of FIG. 5) and body 8 will engage with the opposite surface of the vehicle roof (e.g., the lower surface in the view of FIG. 5).

The device is further able to rotate around the longitudinal axis of the screw 2, rotating between 80° and 115° the moment it is mounted, as will be explained below, without scratching the paint of the body of the vehicle, and allows for longitudinal and transverse movement when mounting the fastening device.

Merely as an example, the fastening method for a roof bar on a vehicle is described below.

First, the device is vertically introduced from the outside of the vehicle through a hole drilled in the roof, either manually or using a tool. When inserted, it is envisaged that the seal 6 butts against the bodywork of the roof 10 at all possible positions, before and after rotation. In particular, seal body 7 is sized to but against the external surface of the body work at all rotational positions of the device so that seal body 7 will engage the external surface when the device is inserted and seal body 8 passes through the opening.

The device is then rotated in the way that was previously explained. This rotation will cause some peripheral edge portions of the bodywork opening to move into the peripheral slot regions of the seal, thereby causing seal body 8 to but against the internal surface of the body work.

Second, the fastening screw 11 of the present invention is vertically introduced through the inside of the vehicle, and through a hole of an inner support of the body of the vehicle, either manually or with a screwdriver. In the case that it is inserted manually, it is provided with a plastic ring 13 (FIG. 4) that has a retaining function for preventing the accidental fall of the same before being screwed.

The screw 11 is then rotated by means of a screw driver, shown in FIG. 3, to the right (according to the screwing direction of the screw 11) by the screw penetrating the area of friction 14 of the overmold of the screw 2 and continuing to advance, making it so that said screw 2 rotates, and by rotating in a clockwise direction, the same advances, as well as the existing tolerance compensation in both the distance and the angle.

By continuing the rotation of the screw 11, the same is introduced in the nut of the roof bar (not shown) and since the device according to the previous point has expanded, the fastening of the assembly takes place, the bar being integral to the body of the vehicle.

Despite the fact that reference has been made to a specific embodiment of the invention, it is evident for a person skilled in the art that numerous variations and changes may be made to the fastening device and method described, and that all the aforementioned details may be substituted by other technically equivalent ones, without detracting from the scope of protection defined by the attached claims.

What is claimed is:

1. A fastening device for fastening a vehicle accessory, comprising a nut (1) and a screw (2) coupled by being screwed together, the screw (2) being movable with respect to the nut (1), characterized in that the screw (2) comprises a head (3) provided with a washer (4) able to tilt in any adjustment direction, an axis of the washer (4) being able to move within an angle by tilting with respect to an axis of the screw (2), wherein said washer (4) is joined to the head (3) of the screw (2) by means of an elastic joint (5).

2. The fastening device according to claim 1, wherein (i) said head (3) of the screw (2) has an outer convex form, which is complementary to an inner concave form of the washer (4) or (ii) said head (3) of the screw (2) has an outer concave form, which is complementary to an inner convex form of the washer.

3. The fastening device according to claim 1, wherein said elastic joint (5) is made by at least one adhesive point.

4. The fastening device according to claim 1, wherein said screw (2) comprises an overmolded body (9) internal of the screw, said overmolded body (9) containing an elastic joint between the head (3) of the screw (2) and the washer (4) for maintaining said elastic joint.

5. The fastening device according to claim 1, wherein the fastening device also comprises a seal (6) integral to the nut (1).

6. The fastening device according to claim 5, wherein said seal (6) which is integral to the nut (1) is able to rotate around the longitudinal axis of the screw (2).

7. The fastening device according to claim 5, wherein said seal (6) is made up of two elongated bodies (7, 8) joined together, said elongated bodies (7, 8) being substantially perpendicular to one another.

8. The fastening device according to claim 5, wherein said seal (6) is made of a thermoplastic elastomer.

9. The fastening device according to claim 1, wherein said washer (4) is metal.

10. A method for fastening a vehicle accessory by means of the fastening device according to claim 5, characterized in that it comprises the following steps:
   vertically introducing the fastening device in a polygonal hole until one portion of the seal (6) butts against one surface of a roof of the vehicle; and rotating the fastening device in a counterclockwise direction until another portion of the seal butts against an opposite surface of the roof of the vehicle.

11. The method for fastening a vehicle accessory according to claim 10, wherein said rotation of the fastening device comprises a first rotation between 10° and 30°, encountering in said rotation a resistance of the seal (6) by encountering faces of the polygonal hole and a second rotation between 80° and 120° until reaching a final stop.

12. The method for fastening a vehicle accessory according to claim 11, wherein the screw (2) is a first screw, and by manually introducing a second screw (11) into the fastening device, the second screw (11) is retained.

13. The method for fastening a vehicle accessory according to claim 12, wherein the second screw (11) is rotated in a clockwise direction to the right according to a direction of a thread of the second screw (11), the thread penetrating an internal friction area (14) of the first screw (2), making the first screw (2) rotate, making the first screw (2) turn, making the first screw advance and compensating for existing tolerance in both distance and angle.

14. A device for fastening a vehicle accessory, comprising a nut and a screw coupled by being screwed together, the screw movable with respect to the nut, wherein the screw comprises a head provided with an adjacent washer that is able to tilt in any adjustment direction relative to the head of the screw, wherein an axis of the washer can move within an angle by tilting with respect to an axis of the screw, wherein said washer is joined to the head of the screw by an elastic joint that retains the washer on the head of the screw while also permitting tilting of the axis of the washer relative to the axis of the screw.

15. The device for fastening a vehicle accessory according to claim 14, wherein (i) said head of the screw has an outer convex form, which is complementary to an inner concave form of the washer or (ii) said head of the screw has an outer concave form, which is complementary to an inner convex form of the washer.

16. The device for fastening a vehicle accessory according to claim 14, wherein said elastic joint is made by at least one adhesive point of connection.

17. The device for fastening a vehicle accessory according to claim 14, wherein said screw comprises an overmolded body internal of the screw, part of said overmolded body forming an elastic joint between the head of the screw and the washer for retaining the washer on the head of the screw.

18. The device for fastening a vehicle accessory according to claim 14, wherein the device also comprises a seal integral to the nut, the seal able to rotate with the nut around the axis of the screw, wherein said seal is made up of two elongated bodies joined together, said elongated bodies having elongated axes that are substantially perpendicular to one another, said elongated bodies spaced apart to define at least one slot along at least one portion of a periphery of the seal.

19. The device for fastening a vehicle accessory according to claim 14, wherein said elastic joint is made by an overmolded body engaged with the washer and extending internally of the screw.

* * * * *